United States Patent
Hettich et al.

(10) Patent No.: US 12,450,210 B2
(45) Date of Patent: Oct. 21, 2025

(54) SYSTEM INTEGRATION USING RUN TYPES

(71) Applicant: SAP SE, Walldorf (DE)

(72) Inventors: Michael Hettich, Heidelberg (DE); Andre Klahre, Angelbachtal (DE)

(73) Assignee: SAP SE, Walldorf (DE)

( * ) Notice: Subject to any disclaimer, the term of this patent is extended or adjusted under 35 U.S.C. 154(b) by 32 days.

(21) Appl. No.: 18/311,425

(22) Filed: May 3, 2023

(65) Prior Publication Data

US 2024/0370416 A1   Nov. 7, 2024

(51) Int. Cl.
  *G06F 16/21* (2019.01)
  *G06F 16/215* (2019.01)
  *G06F 16/23* (2019.01)

(52) U.S. Cl.
  CPC ........ *G06F 16/214* (2019.01); *G06F 16/215* (2019.01); *G06F 16/2365* (2019.01)

(58) Field of Classification Search
  None
  See application file for complete search history.

(56) References Cited

U.S. PATENT DOCUMENTS

| | | | |
|---|---|---|---|
| 10,740,286 B1* | 8/2020 | Gilderman | G06F 9/5038 |
| 10,963,435 B1* | 3/2021 | McAlister | G06F 11/0766 |
| 2006/0229888 A1* | 10/2006 | Colle | G06Q 10/00 |
| | | | 717/108 |
| 2015/0019479 A1* | 1/2015 | Buehne | G06F 16/214 |
| | | | 707/609 |
| 2016/0269488 A1* | 9/2016 | Zhao | H04L 67/141 |
| 2019/0108223 A1* | 4/2019 | Fabijancic | G06F 8/30 |
| 2022/0114150 A1* | 4/2022 | Saurabh | G06F 16/2358 |
| 2022/0237206 A1* | 7/2022 | Andoor Veettil | G06F 11/3442 |
| 2022/0318211 A1* | 10/2022 | Ji | G06F 16/2282 |
| 2023/0128784 A1* | 4/2023 | Zeltwanger | G06F 16/24568 |
| | | | 714/3 |

* cited by examiner

*Primary Examiner* — Kavita Stanley
*Assistant Examiner* — Cao D Vuong
(74) *Attorney, Agent, or Firm* — Buckley, Maschoff & Talwalkar LLC (57) ABSTRACT

Systems and methods include reception of a first object instance of a first object type from a second system and, in response to receipt of the first object instance, determination of a plurality of run types associated with the first object type, the plurality of run types including a first validation run type, a first migration run type and a first execution run type, execution of the respective plurality of tasks of the first validation run type, execution, if no errors occurred during execution of the first validation run type, of the respective plurality of tasks of the first migration run type, and execution of the respective plurality of tasks of the first execution run type to integrate the first object instance of the first object type into one or more object instances of one or more object types of the system.

17 Claims, 6 Drawing Sheets

SYSTEM INTEGRATION USING RUN TYPES

BACKGROUND

Modern system landscapes may consist of independent applications provided by several computing systems. It is often desirable for two applications within a system landscape to interoperate with one another. However, and especially if the two applications are provided by different application vendors, differences in the structure and content of their logical entities (e.g., database objects) may render such interoperation difficult.

In a specific example, product data is regularly sent between different Product Lifecycle Management (PLM) systems during different phases of product development. Product data may be represented in different PLM systems by different objects such as a material object or a Bill of Materials (BOM) object. Meta domain model objects may provide generic representations of a material object and a BOM object, which may be used to map between material objects and BOM objects of different systems.

PLM objects are usually complex and include links to multiple associated other objects. Accordingly, system integration is typically not a simple matter of mapping an instance of one object type to an instance of another object type. In addition to creating and updating of object instances, integration may require migration of existing object instances or validation of object instances received from one system prior to creation/update of one or more corresponding object instances in the receiving system. Moreover, required steps for each task differ across object types, requiring extensive custom coding and domain knowledge to properly implement an integration.

Systems are desired to facilitate the development of object type-specific integrations between applications. The integrations should include object type-specific functions in addition to creation and update, such as but not limited to validation and migration.

DETAILED DESCRIPTION

The following description is provided to enable any person in the art to make and use the described embodiments. Various modifications, however, will be readily-apparent to those in the art.

According to some embodiments, a system integration component includes "run types" which define sequences of processing steps to be executed during processing of an inbound or outbound message. Run types according to some embodiments include validation run types, migration run types and execution run types. Each run type may be associated with one or more message attributes. Accordingly, the attributes of a message (e.g., payload object type) may be used to determine which run type(s) should be executed to process the message.

The run types may facilitate an integration implementation that uses models of mappings between object types of different systems to handle object instance data in a consistent way which ensures proper representation of logical entities within the different systems.

Some embodiments provide reusable integration flows and object scope definitions for different use cases and integration requirements. Run types according to some embodiments are easily extendable by customers for additional requirements or purposes. Run types may conform to a well-structured implementation model that is easy for developers and customers to understand and consume.

Embodiments may be used with synchronous and asynchronous processing and for inbound and outbound messages. Embodiments may be implemented independent of programming language and/or integration technology.

Figure 1:
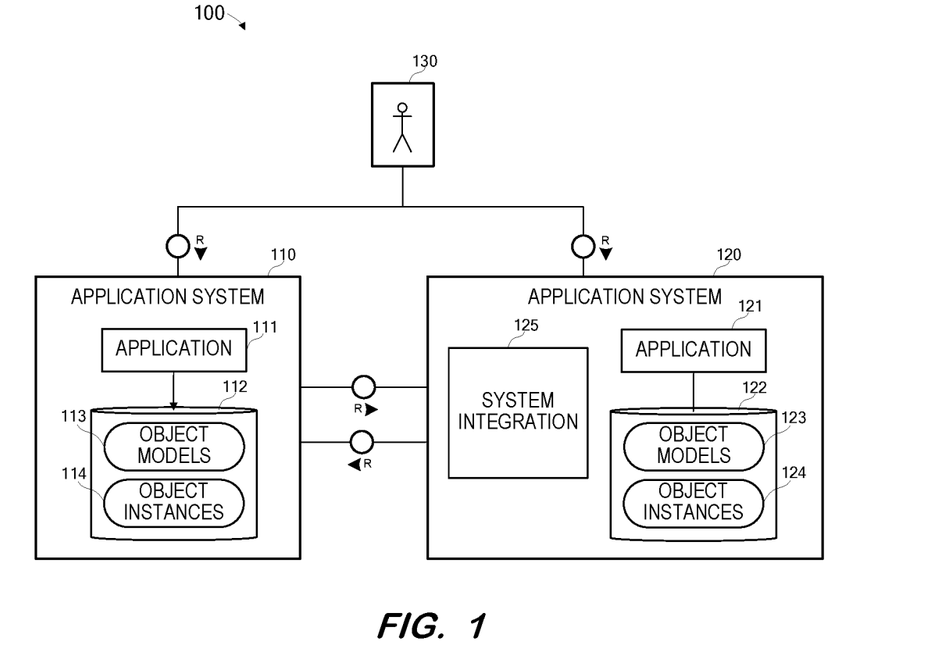
FIG. 1 is a block diagram of an architecture providing application system integration according to some embodiments.

FIG. 1 is a block diagram of architecture 100 according to some embodiments. The illustrated elements of architecture 100 and of all other architectures depicted herein may be implemented using any suitable combination of computing hardware and/or software that is or becomes known. Such combinations may include one or more processing units (microprocessors, central processing units, microprocessor cores, execution threads), one or more non-transitory electronic storage media, and processor-executable program code. In some embodiments, two or more elements of architecture 100 are implemented by a single computing device, and/or two or more elements of architecture 100 are co-located. One or more elements of architecture 100 may be implemented using cloud-based resources, and/or other systems which apportion computing resources elastically according to demand, need, price, and/or any other metric.

Each of application systems 110, 120 and any other system mentioned herein may comprise an on-premise server, a cloud-deployed virtual machine, or any other suitable computing system to provide a software-based application/service to users. Any components of application systems 110, 120 may be implemented in a distributed manner. For example, application system 110 may include a plurality of compute nodes (e.g., servers) and a plurality of database nodes.

While each of application systems 110, 120 may execute more than one application/service, application system 110 is depicted as including application 111 and application system 120 is depicted as including application 121. Application system 110 executes program code of application 111 to provide functionality based on data stored in storage 112. Storage 112 may comprise one or more volatile and/or non-volatile data storage devices. Similarly, application system 120 executes program code of application 121 to provide functionality based on data stored in storage 122, which may comprise one or more volatile and/or non-volatile data storage devices.

Storage 112 includes metadata defining object models 113 as is known in the art. An object model 113 may specify data and logic used to represent a logical entity. Object instances 114 include the data of particular instances of the logical entities. For example, object models 113 may include an object model defining a product object, while object instances 114 may include several instances of the product object, each of which corresponds to a particular product. The logical entities of object models 113 are typically related to the functionality of an application (e.g., application 111) which is intended to access object instances 114.

Storage 122 includes object models 123 and corresponding object instances 124. One or more (and possibly all) of object models 123 may differ from object models 113. A logical entity (e.g., product) represented by an object model 123 may be the same as a logical entity represented by an object model 113 (or by two or more of object models 113), even though the metadata of the object models differ (e.g., specify different data and/or a different data structure).

User 130 transmits requests to application systems 110 and 120. For example, user 130 may operate a computing device to execute a Web browser and to input a Uniform Resource Locator (URL) associated with a domain of systems 110 or 120. The Web browser issues a request based on the URL and receives a Web page or a browser-executable client application as is known in the art to facilitate communication with application 111 or 121.

Application 111 and application 121 may provide related functionality, some of which may overlap. For example, application 111 and application 121 may comprise PLM applications provided by different software vendors, but embodiments are not limited thereto. Accordingly, as described above, it may be desirable to change object instances 114, 124 stored by one of applications 111, 121 based on changes to object instances 114, 124 executed by the other one of applications 111, 121.

Application system 120 includes system integration component 125. According to some embodiments, system integration component 125 determines run types associated with incoming and outgoing messages and executes those run types to process the messages. The processing is intended to allow application 121 to use data of object instances received from application 111 and to provide application 111 with data in a native format conforming to object models 113.

Figure 2A:
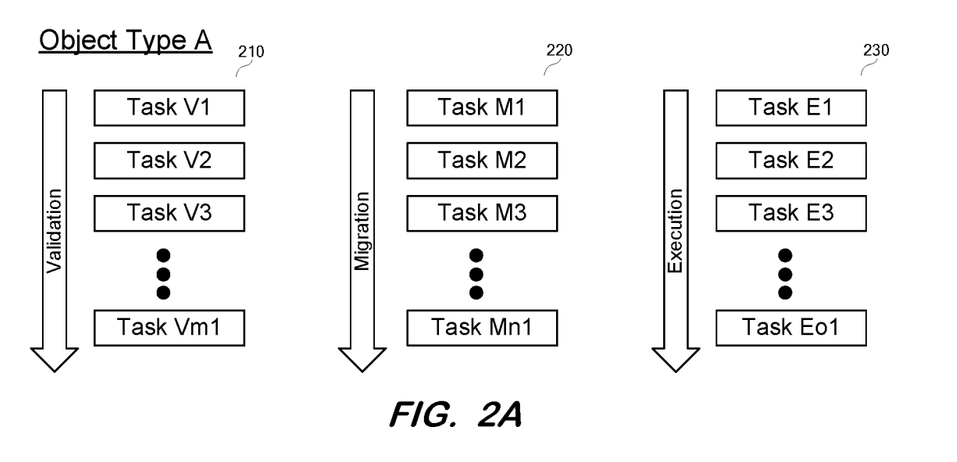
FIGS. 2A through 2C illustrate object-specific run types and their constituent tasks according to some embodiments.
Figure 2B:
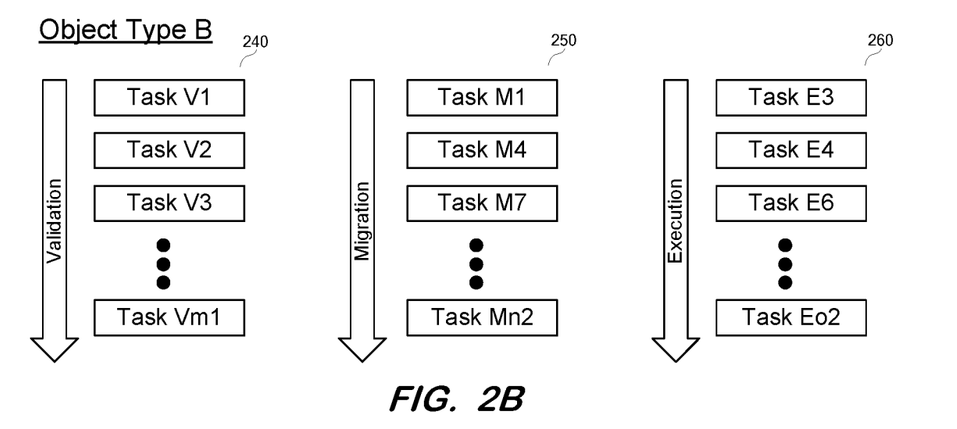
Figure 2C:
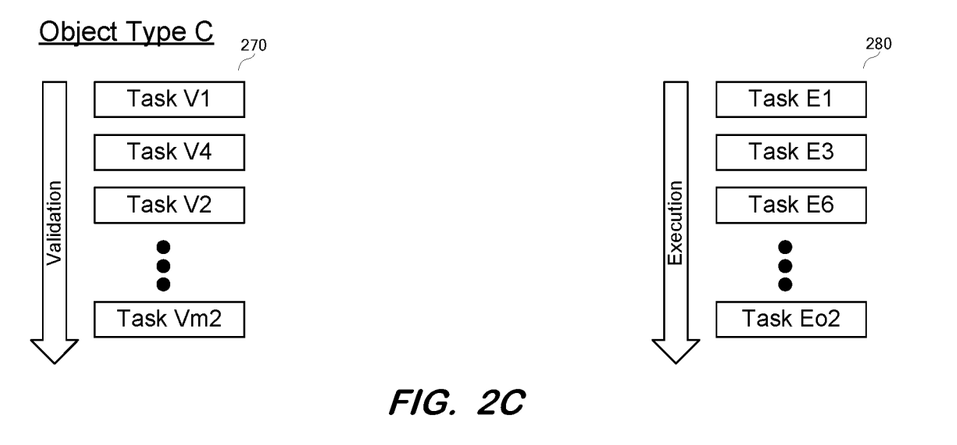

Each of the run types comprises program code of a plurality of associated tasks. One or more tasks (and their associated program code) can be re-used in one or more run types. FIGS. 2A through 2C illustrate object type-specific run types and their constituent tasks according to some embodiments.

In particular, FIG. 2A illustrates validation run type 210, migration run type 220, and execution run type 230 associated with object type A. A validation run type is executable to perform consistency and validation checks on received object instance data against a corresponding object model. A validation run type may be further executable to check the business configuration of an object instance.

A migration run type may be executable to determine and establish links between an object instance received from an external application (e.g., application 111) and an object instance of the application (e.g., application 121) into which the object instance is to be integrated. Such linking extends to linking all the dependencies of each object instance.

An execution run type is executable to perform create, read, update, delete (CRUD) operations on an object instance. The operations may be based on interdependencies between the object instance and other object instances. In the case of a deletion operation, for example, all dependent object instances are deleted before deleting the parent object instance, in order to avoid inconsistencies.

Referring to FIG. 1, if a message including an object instance of object type A is received from system 110, system integration component 125 of system 120 executes validation run type 210, migration run type 220, and execution run type 230 in order to integrate the data of the object instance into object instances 124 as indicated by the message.

Similarly, as illustrated in FIG. 2B, if a message including an object instance of object type B is received from system 110, system integration component 125 of system 120 executes validation run type 240, migration run type 250, and execution run type 260 in order to integrate the data of the object instance into object instances 124 as indicated by the message.

According to the above examples, validation run types 210 and 240 are identical. Embodiments are not limited thereto. In this regard, validation run type 270 differs from validation run types 210 and 240. Validation run type 270 includes a same initially-performed task (i.e., Task V1) as validation run types 210 and 240, but a different subsequently-performed task (i.e., Task V4).

Notably, the program code of individual tasks may be re-used for among different validation run types. As mentioned above, each of validation run types 210, 240 and 270 includes Task V1. Each of validation run types 210, 240 and 270 also includes Task V2, although Task V2 is the second-executed task in validation run types 210 and 240 and is the third-executed task in validation run type 270.

The foregoing characteristics also apply to migration run types and execution run types. Migration run types 220 and 250 share a same first task (i.e., Task M1) but consist of different second (i.e., Task M2 vs. Task M4), third (i.e., Task M3 vs. Task M7) and last (i.e., Task Mn1 vs. Task Mn2) tasks. Execution run types 230, 260 and 280 differ from one another but share various tasks.

FIG. 2C shows association of object type C with validation run type 270 and execution run type 280. Object type C is not associated with any migration run type. Therefore, if a message including an object instance of object type C is received from system 110, system integration component 125 executes only validation run type 270 and execution run type 280.

Figure 3:
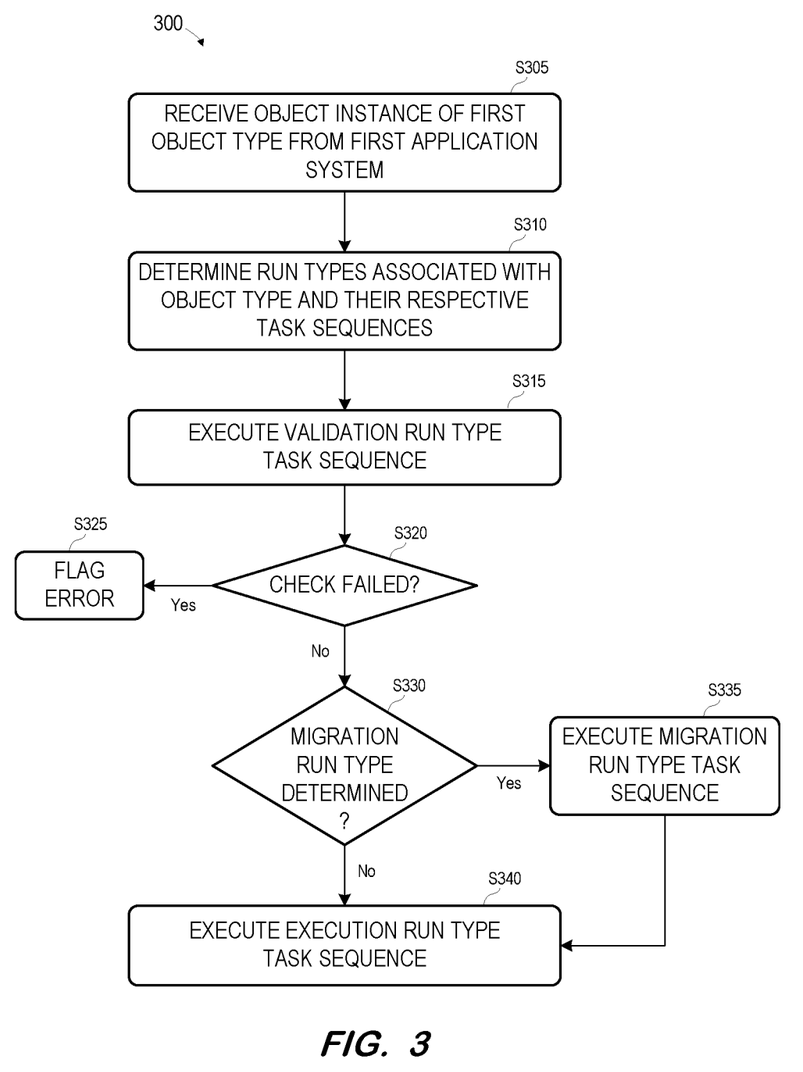
FIG. 3 is a flowchart of process steps to integrate an object instance from one application system into another application system according to some embodiments.

FIG. 3 comprises a flow diagram of process 300 to provide execution of object type-specific run types for system integration according to some embodiments. Process 300 and all other processes mentioned herein may be embodied in program code executable by one or more processing units (e.g., processor, processor core, processor thread) and read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

At S305, a first object instance of a first object type is received from a first application system. The first object instance may be received within a message received from the first application system. The first application system may determine when to send the first object instance and may send the first object instance within a batch of object instances of various object types. In one example, the first object instance is an instance of a Bill of Materials object type.

Next, at S310, run types associated with the first object type are determined. Also determined at S310 are the task sequences (i.e., the constituent tasks and their order of execution) for each determined run type. Associations between object types and run types may be stored in metadata (e.g., within system integration component 125) and associations between run types and task sequences may be similarly stored in metadata. These associations may be used at S310 to determine the run types and their task sequences.

In some embodiments, flow proceeds directly from S305 to S310 upon receipt of a first object instance. In other embodiments, a user must manually trigger the integration sequence which begins at S310. The option which is used may be controlled by a user-selected configuration setting.

The present embodiment assumes that each object type will be associated with a validation run type. Accordingly, a particular validation run type and its respective task sequence are determined at S310. This task sequence is executed at S315. System integration component 125 may include the program code of each task of the task sequence, but embodiments are not limited thereto. As described above, execution of the task sequence may result in checking consistency and validating data of the first object instance against a corresponding object model, and also checking of the business configuration of the first object instance. S315 may comprise any validity and/or consistency checks that are or become known.

Flow proceeds to S325 via S320 if any of the checks performed at S315 failed. At S325, an error is flagged to appropriate personnel and process 300 terminates. Flow may proceed to S325 once a check fails, rather than after waiting for execution of the entire task sequence.

Flow proceeds from S320 to S330 if the checks of the executed task sequence are sufficiently passed. At S330, it is determined whether a migration run type was determined at S310. In this regard, and as illustrated in FIG. 2B, some object types might not be associated with a migration run type. If a migration run type was determined at S310, the task sequence determined for the migration run type is executed at S335 and flow proceeds to S340.

Flow also proceeds to S340 directly from S330 if a migration run type was not determined at S310. At S340, the task sequence of the execution run type determined at S310 is executed. Depending on the contents of the message in which the first object instance was received at S305, the execution run type task sequence may create, read, update, and/or delete one or more object instances of one or more object types. Process 300 then terminates and is again initiated upon receipt of a next object instance from the first application system. It should be noted that many instances of process 300 may be executed simultaneously to integrate various received object instances in parallel. Care of course should be taken to avoid conflicts during such parallel processing.

The execution run type task sequence may also generate one or more outgoing messages including one or more object instances. Such operation therefore implements a "closed loop" system, in which changes to an object instance in a first system result in changes to an object instance in a second system, which in turn result in changes to an object instance in the first system.

Figure 4:
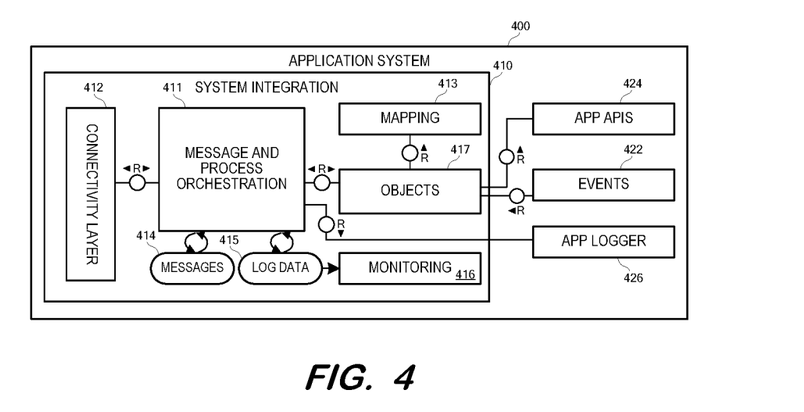
FIG. 4 is a block diagram of a system integration component according to some embodiments.

FIG. 4 is a block diagram of system 400 according to some embodiments. System 400 may comprise an implementation of application system 120 of FIG. 1 but embodiments are not limited thereto. Each component of system 400 may be implemented using executable program code.

Application system 400 includes system integration component 410 which may comprise an implementation of system integration component 125 of system 120. System integration component 410 includes message and process orchestration component (MPO) 411 which may execute process 300 as described above. For example, connectivity layer 412 receives incoming messages including object instances and MPO component 411 determines and executes associated run type task sequences.

Such execution may include mapping between internal objects defined in object metadata 417 and meta domain model objects using mappings 413. MPO component 411 receives events 422 raised by an application and may call to APIs 424 exposed by the application. MPO component 411 may provide application-specific log information to application logger 426. MPO component 411 also writes to messages 414 and log data 415. Monitoring component 416 may access log data 415 to provide monitoring of system integration component 410.

Figure 5:
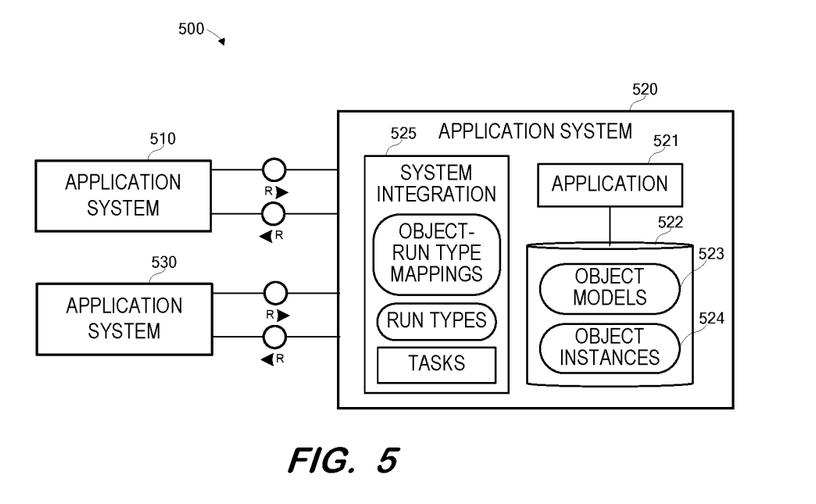
FIG. 5 is a block diagram of an architecture providing application system integration according to some embodiments.

FIG. 5 is a block diagram of architecture 500 according to some embodiments. Architecture 500 may comprise an implementation of architecture 100 but embodiments are not limited thereto. Unlike architecture 100, architecture 500 includes two external application systems 510, 530.

Each of application systems 510, 530 may operate based on respective sets of object models and may provide related functionality. Each of application systems 510, 530 may transmit messages to and received messages from application system 520. The messages may include data of object instances of their respective object models.

System integration component 525 of application system 520 includes metadata specifying object type-to-run type mappings and run types-to-task sequence mappings as described above. System integration component 525 also includes program code of tasks which may be used in the task sequences. Accordingly, system integration component 525 may use the object type-to-run type mappings to determine run types associated with an object instance of a first object type and use the run types-to-task sequence mappings to determine a sequence of tasks for each determined run type. Finally, the tasks of each sequence may be executed in the specified order.

Figure 6:
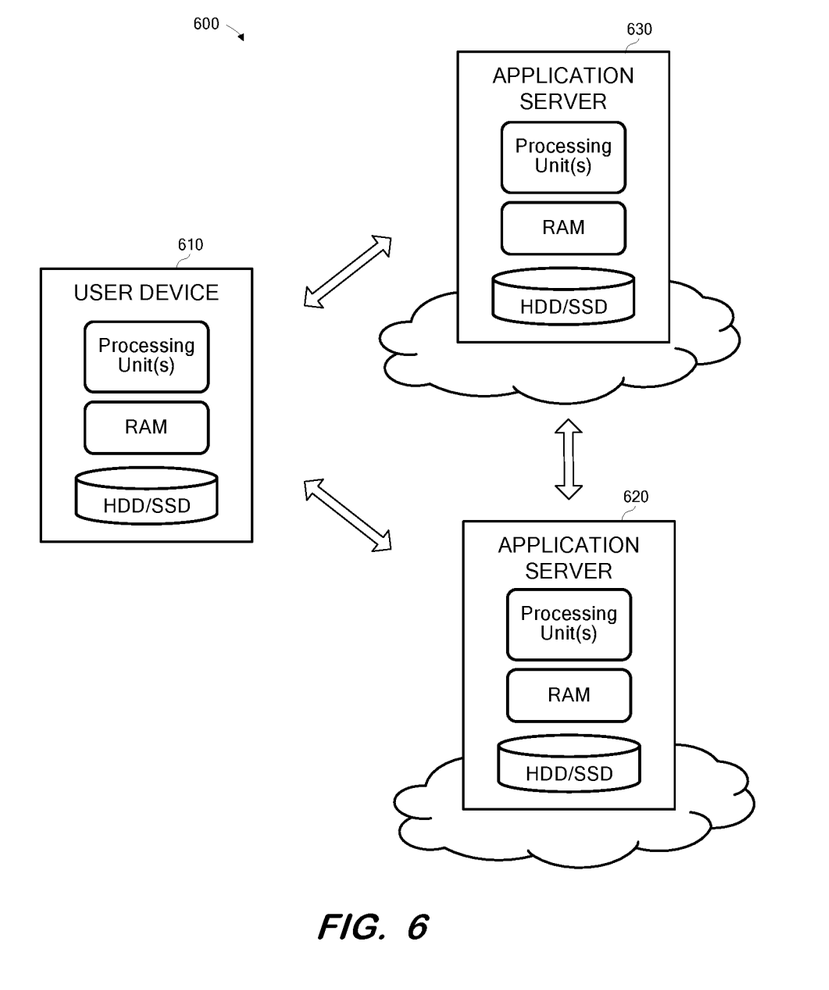
FIG. 6 is a block diagram of a cloud-based architecture providing application system integration according to some embodiments.

FIG. 6 illustrates cloud-based database deployment 600 according to some embodiments. In this regard, application servers 620 and 630 may comprise cloud-based compute resources, such as virtual machines, allocated by a public cloud provider providing self-service and immediate provisioning, autoscaling, security, compliance and identity management features.

User device 610 may issue a request an application executing on application server 620, for example via a Web browser executing on user device 610. The request may be routed to application server 620 according to Internet protocols. During execution of the application, the application may transmit a message including an object instance to an application executing on application server 630. Next, a system integration component of application server 630 may determine and execute run type task sequences based on an object type of the object instance as described herein.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of architecture 100 or 500 may include a programmable processing unit to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A method comprising:
   executing a first process to:
   receive, at a first application system, a first object instance of a first object type of a second application system; and
   in response to receipt of the first object instance:
   determine a plurality of run types associated with the first object type, the plurality of run types including a first validation run type to perform consistency checks on the first object instance, a first migration run type to determine links between dependencies of the first object instance of the second application system and dependencies of one or more object instances of the first application system into which the first object instance is to be integrated and a first execution run type to perform create, read, update, or delete operations on the object instance of the first application system, each of the determined run types comprising a respective plurality of tasks;
   execute the respective plurality of tasks of the first validation run type;
   determine that no errors occurred during execution of the first validation run type;
   execute the respective plurality of tasks of the first migration run type; and
   execute the respective plurality of tasks of the first execution run type to integrate the first object instance of the second application system into the one or more object instances of the first application system based on the determined links between the dependencies of the first object instance of the second application system and the dependencies of the one or more object instances of the first application system; and in parallel with execution of the first process, execute a second process to:
   receive, at the first application system, a second object instance of a second object type of the second application system; and
   in response to receipt of the second object instance:
   determine a second validation run type to perform consistency checks on the second object instance, a second execution run type associated with the second object type and no migration run types associated with the second object type, the second validation run type comprising a respective plurality of tasks different from the plurality of tasks of the first validation run type, and the second execution run type comprising a respective plurality of tasks different from the plurality of tasks of the first execution run type;
   execute the respective plurality of tasks of the second validation run type; and
   execute the respective plurality of tasks of the second execution run type to integrate the second object instance of the second object type into a second one or more object instances of a second one or more object types of the first application system.

2. A method according to claim 1, wherein one of the respective plurality of tasks of the first validation run type is identical to one of the respective plurality of tasks of the second validation run type, and one of the respective plurality of tasks of the first execution run type is identical to one of the respective plurality of tasks of the second execution run type.

3. A method according to claim 1, wherein execution of the respective plurality of tasks of the first validation run type comprises checking of the consistency of data of the first object instance.

4. A method according to claim 3, wherein execution of the respective plurality of tasks of the first execution run type comprises creation of the one or more object instances of the first application system.

5. A method according to claim 3, wherein execution of the respective plurality of tasks of the first execution run type comprises updating of the one or more object instancesof the first application system.

6. A method according to claim 3, wherein execution of the respective plurality of tasks of the first execution run type comprises deletion of the one or more object instances of the first application system.

7. A non-transitory computer-readable medium storing program code executable by one or more processing units to cause a computing system to:
   execute a first process to:
   receive, at a first application system, a first object instance of a first object type of a second application system; and
   in response to receipt of the first object instance:
   determine a plurality of run types associated with the first object type, the plurality of run types including a first validation run type to perform consistency checks on the first object instance, a first migration run type to determine links between dependencies of the first object instance of the second application system and dependencies of one or more object instances of the first application system into which the first object instance is to be integrated, and a first execution run type to perform create, read, update, or delete operations on the object instance of the first application system, each of the determined run types comprising a respective plurality of tasks;

execute the respective plurality of tasks of the first validation run type;
determine that no errors occurred during execution of the first validation run type;
execute the respective plurality of tasks of the first migration run type; and
execute the respective plurality of tasks of the first execution run type to integrate the first object instance of the second application system into the one or more object instances of the first application system based on the determined links between the dependencies of the first object instance of the second application system and the dependencies of the one or more object instances of the first application system; and
in parallel with execution of the first process, execute a second process to:
receive, at the first application system, a second object instance of a second object type of the second application system; and
in response to receipt of the second object instance:
determine a second validation run type to perform consistency checks on the second object instance, a second execution run type associated with the second object type and no migration run types associated with the second object type, the second validation run type comprising a respective plurality of tasks different from the plurality of tasks of the first validation run type, and the second execution run type comprising a respective plurality of tasks different from the plurality of tasks of the first execution run type;
execute the respective plurality of tasks of the second validation run type; and
execute the respective plurality of tasks of the second execution run type to integrate the second object instance of the second object type into a second one or more object instances of a second one or more object types of the first application system.

8. A medium according to claim 7, wherein one of the respective plurality of tasks of the first validation run type is identical to one of the respective plurality of tasks of the second validation run type, and one of the respective plurality of tasks of the first execution run type is identical to one of the respective plurality of tasks of the second execution run type.

9. A medium according to claim 7, wherein execution of the respective plurality of tasks of the first validation run type comprises checking of consistency of data of the first object instance.

10. A medium according to claim 9, wherein execution of the respective plurality of tasks of the first execution run type comprises creation of the one or more object instances of the first application system.

11. A medium according to claim 9, wherein execution of the respective plurality of tasks of the first execution run type comprises updating of the one or more object instances of the first application system.

12. A medium according to claim 9, wherein execution of the respective plurality of tasks of the first execution run type comprises deletion of the one or more object instances of the first application system.

13. A system comprising:
one or more processing units; and
a non-transitory memory storing program code executable by the one or more processing units to cause the system to:
receive, at the system, a first object instance of a first object type of a second system; and in response to receipt of the first object instance:
determine a plurality of run types associated with the first object type, the plurality of run types including a first validation run type to perform consistency checks on the first object instance, a first migration run type to determine links between dependencies of the first object instance of the second system and dependencies of one or more object instances of the system into which the first object instance is to be integrated, and a first execution run type to perform create, read, update, or delete operations on the object instance of the system, each of the determined run types comprising a respective plurality of tasks;
execute the respective plurality of tasks of the first validation run type;
determine that no errors occurred during execution of the first validation run type;
execute the respective plurality of tasks of the first migration run type; and
execute the respective plurality of tasks of the first execution run type to integrate the first object instance of the second system into the one or more object instances of the system based on the determined links between the dependencies of the first object instance of the second system and the dependencies of the one or more object instances of the system; and
in parallel with execution of the first process, execute a second process to:
receive, at the first application system, a second object instance of a second object type of the second application system; and
in response to receipt of the second object instance:
determine a second validation run type to perform consistency checks on the second object instance, a second execution run type associated with the second object type and no migration run types associated with the second object type, the second validation run type comprising a respective plurality of tasks different from the plurality of tasks of the first validation run type, and the second execution run type comprising a respective plurality of tasks different from the plurality of tasks of the first execution run type;
execute the respective plurality of tasks of the second validation run type; and
execute the respective plurality of tasks of the second execution run type to integrate the second object instance of the second object type into a second one or more object instances of a second one or more object types of the first application system.

14. A system according to claim 13, wherein one of the respective plurality of tasks of the first validation run type is identical to one of the respective plurality of tasks of the second validation run type, and one of the respective plurality of tasks of the first execution run type is identical to one of the respective plurality of tasks of the second execution run type.

15. A system according to claim 13, wherein execution of the respective plurality of tasks of the first validation run type comprises checking of consistency of data of the first object instance.

16. A system according to claim 15, wherein execution of the respective plurality of tasks of the first execution run type comprises creation of the one or more object instances of the system.

17. A system according to claim 15, wherein execution of the respective plurality of tasks of the first execution run type comprises updating of the one or more object instances of the system.

* * * * *